United States Patent [19]
Dittell

[11] Patent Number: 5,575,159
[45] Date of Patent: Nov. 19, 1996

[54] HEAT ENERGY TRANSFER SYSTEM

[76] Inventor: Edward W. Dittell, 300 Greenhill La., Long Lake, Minn. 55356

[21] Appl. No.: 459,812

[22] Filed: Jun. 2, 1995

[51] Int. Cl.$^6$ .................................. F25B 5/00; F25B 27/00
[52] U.S. Cl. ............................. 62/199; 62/201; 62/238.6
[58] Field of Search .................. 62/199, 201, 238.6, 62/435

[56] References Cited

U.S. PATENT DOCUMENTS 4,012,920  3/1977  Kirschbaum .................. 62/238.7 X
4,637,219  1/1987  Grose ........................... 62/199

Primary Examiner—William E. Wayner
Attorney, Agent, or Firm—Haugen and Nikolai, P.A.

[57] ABSTRACT

A heat energy transfer system including a refrigeration loop with a heat transfer engine connected in series with a condenser, a thermal expansion valve and an evaporator has associated with the evaporator a heat exchanger that is coupled in circuit with a container of water or other-suitable heat transfer fluid. The warmer fluid proximate the top of the container is drawn off and fed through the heat exchanger and returned to the bottom of the container. The thus chilled fluid can be pumped to utilization devices again with the colder fluid at the bottom of the buffer or container being pumped to the utilization device and returned, after warming, to the top of the container. An auxiliary closed exchange loop may also be incorporated to supply heat energy needs to the evaporator of the refrigeration loop in the event that the cold buffer contents are chilled to the point where insufficient heat energy is contained in it to provide evaporization of the refrigerant before being fed to the heat transfer engine.

12 Claims, 1 Drawing Sheet

HEAT ENERGY TRANSFER SYSTEM

BACKGROUND OF THE INVENTION

I. Field of the Invention

This invention relates generally to heating, ventilating and air-conditioning (HVAC) systems, and more particularly to a refrigeration system incorporating one or more cold buffers and optionally at least one closed exchange loop for recovering heat energy from a heat transfer fluid and storing same for subsequent transfer to one or more hot buffers disposed on the high pressure side of the system.

II. Discussion of the Prior Art

In my earlier U.S. Pat. Nos. 4,382,368 and 4,633,676, there is described a heating and cooling system that utilizes three components, referred to as "energy handlers", "buffers", and "power packs", in a way that effects substantial energy savings when compared to present methods utilizing consumption of fossil fuel for heating and electrical energy for air conditioning.

The '368 patent describes a system including a refrigeration loop in which a refrigerant, such as Freon 22, is compressed in 20. its gaseous state and subsequently cooled in a condenser to convert the refrigerant to a liquid state and subsequently made to pass through an expansion valve and an evaporator to again change the liquid refrigerant back to a gas. Coupled in heat transfer relationship to the condenser coils are heat exchangers that are connected in circuit with one or more hot buffers for storing an energy transfer fluid, e.g., water, for later use as a hot fluid supply. Thus, rather than merely passing air over the condenser coils and dissipating the heat energy to the outdoor ambient, the fluid passed through the heat exchangers closely coupled to the condenser coils is heated for later use.

My U.S. Pat. No. 4,733,676 describes an energy transfer system for transferring energy from and to a source liquid, such as well water, so as to provide both cooling and heating. It, too, includes a refrigeration system having an evaporator, a compressor, a condenser and an expansion valve for extracting heat from the well water through the evaporator and dissipating the heat through the condenser. In this arrangement, water stored in "hot buffer" tanks is conveyed through a conduit and into heat transfer relationship with the condenser. Heat energy is extracted from the condenser and absorbed by the water for future use by one or more energy handlers.

The present invention is related to my earlier inventions reflected in the aforereferenced U.S. Pat. Nos. 4,382,368 and 4,633,676, but differs therefrom by recognizing that further energy savings may be realized by incorporating heat exchangers and buffers on the low or cold side of the refrigeration system. In this way, heat energy is conserved by transferring it from place to place and constantly reusing it. It is found that transferring energy is significantly less expensive and substantially more efficient than generating new heat energy such as by burning of natural gas or other fossil fuels. The efficiency of the system of the present invention is derived fundamentally from its philosophy or methodology. This philosophy, among other things: (1) allows multiple jobs to be done for about the cost of one, (2) utilizes energy normally wasted from other processes, (3) utilizes energy recovered from other sources, (4) incorporates components that specifically sized for the job to be done and are not compromised sizes as required by present equipment technology, (5) reduces the size of the compressor for peak demands because of the system's ability to store energy in buffers for delivery at a peak time, and (6) optionally, produces domestic hot water in addition to cooling and heating space.

One of the factors contributing to the lower installation cost of system constructed in accordance with the present invention is the fact that the compressor need not be sized to the peak energy demands of the building, but instead, to the average demand. The storage buffers and energy handlers (utilization devices) are sized to deliver the peak demands. Thus, for example, the compressor has the "off peak" time to "charge up" the storage buffers. Most prior art systems are sized to meet the peak demand, even though that demand may only occur a few times a year, if ever. This can be very expensive and wasteful because it requires the purchase and installation of very costly equipment and requires the user to pay the starting and running costs for oversized equipment for its entire lifetime.

An example of this feature is perhaps best personified by considering an installation in a church building. The compressor and the heat exchanges associated with the condenser and evaporator would have all week to "charge" an energy transfer fluid (water) in a storage buffer, allowing a less expensive but efficient heat exchanger to deliver the "peak load" for a few hours on the weekend.

Using the principles of the present invention, one may heat at night with energy removed during the day. Similarly, one may cool when the sun is entering an office from the South, but heat the rest of the time.

SUMMARY OF THE INVENTION

The present invention comprises an improvement to an energy transfer system of the type including a refrigerant carrying loop having, in series, a compressor or other type of heat transfer engine, a condenser, a first thermal expansion means and a main evaporator. The improvement centers upon providing a first heat exchanger in heat exchange relationship with the main evaporator to thereby provide heat energy to that evaporator. A cold buffer in the form of a storage tank containing a suitable heat transfer fluid, typically water, is plumbed in fluid communication with the first heat exchanger whereby the heat content of the water circulated through the heat exchanger is extracted at the main evaporator, with the cooled water being returned to the bottom of the buffer. The system further incorporates a means for supplying the heat transfer fluid from the cold buffer to a utilization device, such as chilling coils or a dehumidifier or the like. The warmed return from the utilization device goes into the cold buffer at its upper end where it may again be circulated through the heat exchanger associated with the system's main evaporator and then returned to the cold buffer through an inlet at its lower end.

As a further refinement of the system, it may include a closed exchanger loop consisting of an auxiliary evaporator and a second thermal expansion means adapted to be connected in a series loop with the heat transfer engine (compressor or absorption device) and condenser through a selector valve. A temperature sensitive switch disposed in the cold buffer is arranged to control the selector valve such that the auxiliary evaporator and second thermal expansion means are coupled in circuit with the heat transfer engine and condenser when a predetermined temperature condition of the heat transfer fluid in the cold buffer prevails. Associated with the auxiliary evaporator is an auxiliary heat exchanger that is connected in a fluid circuit with a further heat exchanger associated with a heat source. Hence, if the cold buffer is incapable of delivering heat energy to the main evaporator, the auxiliary system will be switched into operation to supply the heat energy required to maintain the heat transfer engine operational. Typically, and without limitation, the heat source associated with the auxiliary loop may be a body of surface water, well water, aquifer, or the earth which remains at a constant temperature year around only a few feet down.

The rate of flow of heat transfer fluid from the cold buffer to the first heat exchanger means and/or through the closed exchange loop including the auxiliary heat exchanger is controlled by individual flow control means in each circuit. For example, the flow control means may be responsive to the suction pressure at a compressor such that if the suction pressure begins to decrease, fluid flow through the heat exchanger loops associated with the main and/or auxiliary evaporators is increased so as to deliver more heat energy to the system.

DESCRIPTION OF THE DRAWINGS

The foregoing features, objects and advantages of the invention will become apparent to those skilled in the art from the following detailed description of a preferred embodiment, especially when considered in conjunction with the accompanying drawing which is a schematic mechanical drawing of the heat energy transfer system of the present invention.

DESCRIPTION OF THE PREFERRED EMBODIMENT

Figure 1:
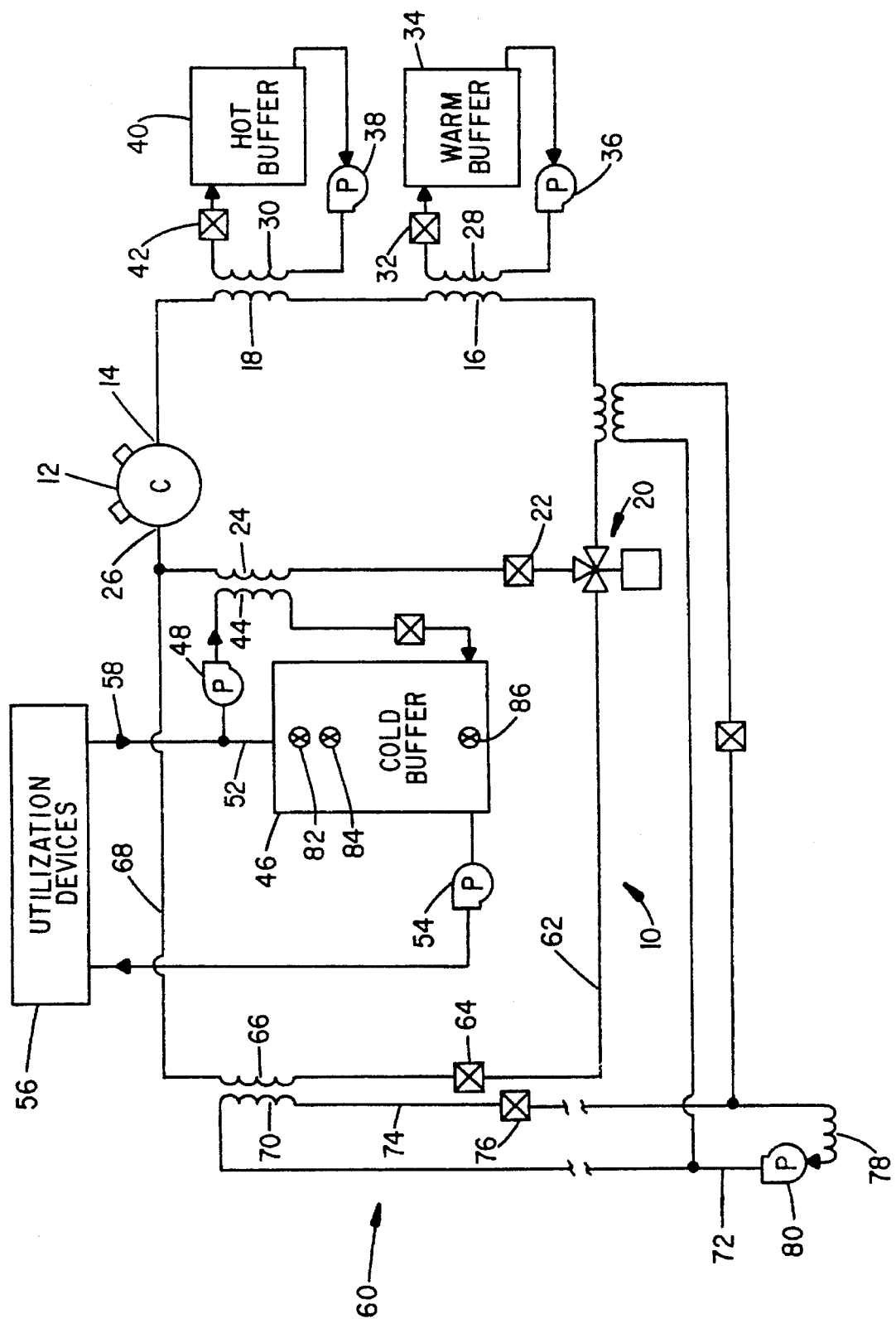

Referring to the drawing, there is indicated generally by numeral 10 a heat energy transfer system incorporating the present invention. It is seen to include an electric motor-driven compressor 12 having its high pressure side 14 coupled by tubing to first and second condenser coils 16 and 18 and to a selector valve 20. While for exemplary purposes a motor driven compressor is illustrated as being a heat transfer engine, other types, such as absorption devices, or chemical engines, Pelter effect devices may be used as well. The selector valve can be controlled to direct the liquid refrigerant exiting the condensers 16 and 18 through a thermal expansion valve 22, and thence to one side of an evaporator coil 24, whose other side is connected to the suction side 26 of the compressor 12.

In accordance with the teachings of my earlier U.S. Pat. Nos. 4,382,368 and 4,633,676, there is associated with the condenser coils 16 and 18 heat exchangers 28 and 30, respectively. The heat exchanger 28 is connected in circuit with a flow control mechanism 32, a warm buffer 34 and a pump 36. The pump 36 serves to circulate a heat transfer fluid, typically water, through the heat exchanger 28, thus transferring heat energy to the heat transfer fluid contained within the warm buffer 34. Still in accordance with my earlier patents, condenser 18 functions as a desuperheating condenser and coupled in heat transfer relationship with it is the heat exchanger 30. A pump 38 circulates the water stored in the hot buffer tank 40 through the heat exchanger coil 30 and a flow control mechanism 42 whereby heat energy given up by the super heat condenser 18 is used to generate a hot water supply for delivery from the hot buffer 40 to some type of utilization device or energy handler (not shown).

In accordance with the teachings of the present invention, there is also associated with the evaporator coil 24 on the low or cold side of the refrigeration loop a heat exchanger 44. It is juxtaposed to the evaporator coil 24 so as to transfer whatever heat energy may be present in a cold buffer 46 to the evaporator coil 24. More particularly, the heat exchanger coil 44 is connected in a fluid circuit with the cold buffer 46 by way of a pump 48 and a flow control mechanism 50. The pump 48 is configured to draw stratified higher temperature fluid (water) from the top portion of the cold buffer tank, via inlet/outlet line 52, and run it through the heat exchanger coil 44 controlled by the mechanism 50. The heat transfer fluid may comprise of a phase change substance, such as shush or eutectic salts.

While not illustrated in the drawing, the flow control mechanism 50 could be coupled by a capillary line to the suction side of the compressor 12 so that as the suction pressure varies, the volume rate of flow of fluid through the heat exchanger 44 will also vary, but inversely with pressure. That is to say, when the suction pressure of the compressor 12 drops, meaning that it is calling for more heat energy, the flow control mechanism 50 opens proportionally to allow an increase of flow of heat transfer fluid from the buffer 46 through the heat exchanger coil 44. Flow control mechanism 50 or 76 could be eliminated by utilizing a variable speed pump 48 or 80.

The heat transfer fluid contained within the cold buffer 46 may also be circulated by means of a pump 54 to a utilization device(s) or energy handler(s) 56. The coldest fluid is drawn out of the bottom of the buffer 46 with the return flowing through line 58 back to the inlet/outlet 52 at the top of the cold buffer. Typically, the utilization or energy handler(s) may comprise a dehumidifying device for removing moisture from the air in a zone or, alternatively, it may be passed through cooling coils disposed in an air flow stream for providing air conditioning to that zone. Cooling coils of many types may be employed, i.e., ice rink freezing coils, process cooling coils, etc.

If a utilization device 56 is not calling for cooling power, it is possible that the contents of the cold buffer may be chilled to the point where it is incapable of providing heat energy to the evaporator coil 24. In this event, in order to insure that the compressor 12 will operate at its highest efficiency rating, the present invention contemplates the optional further incorporation of a closed exchange loop indicated generally by numeral 60. By appropriately activating an actuating or modulating selector valve 20, the liquid refrigerant exiting the condenser coils 16 and 18 can be made to flow partially or completely through the line 62 and a thermal expansion valve 64, through an auxiliary evaporator coil 66 and line 68 back to the suction side of the compressor 12. Associated with the auxiliary evaporator coil 66 is an auxiliary heat exchanger coil 70 that is closely coupled in heat exchange relationship with the evaporator 66. The lines 72 and 74 leading to and from the auxiliary heat exchanger coil 70 are filled with a suitable heat transfer fluid which, in a cold climate, may comprise an antifreeze solution. A flow control mechanism 76 is included in the line 74, as is a heat exchanger 78 and a pump 80 capable of circulating the heat transfer fluid. The heat exchanger 78 is adapted to be disposed in a suitable source of heat energy which typically may be geothermal. Thus, the heat exchanger 78 may be disposed a predetermined distance under the surface of the earth where temperature remains relative constant. Also, it may be submerged in an aquifer or disposed in a body of water, such as a lake. In either event, the closed exchange loop 60 is always capable of supplying heat energy to the evaporator coil 66 such that the compressor 12 can be made to operate efficiently even when the cold buffer(s) in the system are depleted of heat energy.

Those skilled in the art will appreciate that various components normally used in refrigeration or heat pump systems are not specifically shown in the drawing. That is, such things as receivers, accumulators, filters, dryers, etc., are considered to be well known in the art and need not be specifically illustrated. However, their use to enhance system efficiency and to protect the system components would typically be included. Other recommended safety or system protection devices, such as freeze protection devices on all heat transfer fluids, pressure monitoring devices to detect leaks or blockages in liquid lines and fusible plugs to protect the system from hazardous pressure buildup are also recommended. Moreover, persons skilled in the art will recognize that a variety of components are available in the heating and air conditioning field which can be used to implement the flow control valves and the thermal expansion valves. Although a compressor 12 is illustrated in the drawing, it is not mandated for a functioning system. Any "heat pump" system may be utilized, including, but not limited to, an absorption system. The pumps and flow restrictors are located relative to the various heat exchanger coils to ensure that the coils are always totally flooded with the heat exchange liquid and without the presence of air or other gases that could impede heat transfer therethrough.

Associated with different levels in the cold buffer 46 are a plurality of thermal switches as at 82, 84 and 86. These switches are connected in controlling relationship to the selector switch 20 and the pumps 48 and 80.

When the first of the utilization device 56 begins operating, pump 54 will be turned on. Similarly, when the last of a series of utilization devices 56 is turned off, the pump 54 will also be turned off. The thermal switches 82, 84 and 86 help control operation of the compressor 12. In this regard, when the uppermost thermal switch 82 is turned off because of the buffer 46 being totally filled with cold heat transfer fluid, the closed exchange loop 60 must be switched in by the diverter valve 20 in order for the compressor 12 to continue to operate efficiently.

From the foregoing description of the constructional features of the system of the present invention, it is apparent that the cold buffer 46 is integrated into the system by two connections-one to the heat exchanger 44 associated with the evaporator coil 24 and the other to the utilization devices or energy handler(s) 56. The connections to the heat exchanger 44 normally circulate the warmer heat transfer fluid from the top of the cold buffer 46 to the evaporator 24 where the desired amount of heat energy is transferred and the cooler heat transfer fluid is then deposited into the colder bottom of the buffer 46. This process continues as long as the cold buffer 46 has heat energy that may be efficiently transferred through the evaporator 24 and the refrigeration loop to the warm buffer 34 and the hot buffer 40. When a cold buffer is no longer capable of supplying heat energy to the refrigeration loop via evaporator 24, the compressor 12 will be shut off, or optionally, reconfigured to obtain heat energy from an alternative source, i.e., another cold buffer (not shown) or from the closed exchange loop 60.

The connection of the cold buffer 46 to the cooling utilization devices 56 is similar to that of the connection of the warm buffer 34 and hot buffer 40 to heating type utilization devices. The cold heat transfer fluid normally is transferred from the coldest part or bottom of the cold buffer 46. Upon demand, a pump controlled by a utilization device circulates the cold heat transfer fluid taken from the bottom of the buffer and circulates it through a cooling or dehumidifying type energy handler. The resulting warmed heat transfer fluid is made to return to the cold buffer proximate its top where it remains by natural stratification until transferred by the refrigeration loop.

While the embodiment illustrated in the drawing shows only a single cold buffer 46, it can be appreciated that system expansion is quite easy. Additional refrigeration loops, buffers or utilization devices can readily be added to accommodate increased demand.

OPERATION

The operation of the present invention as regards the use of heat exchangers 28 and 30 cooperating with the condenser coils 16 and 18 of the refrigeration loop are as in my earlier above-referenced patents. The present invention extends the concept to the inclusion of one or more cold buffers 46 coupled in a heat energy exchanging relationship to the evaporator coil 24 of the refrigeration loop. As the refrigeration cycle takes place, the cold buffer 46 gives up its heat energy to the evaporator coil which is then transferred, via the compressor 12, to the hot side of the system. The colder heat transfer fluid contained in the cold buffer 46 is supplied, on demand, to utilization devices 56 by way of a pump 54 with the returned warmer fluid re-entering the buffer proximate its upper end. The rate of transfer of heat energy from the heat exchanger coil 44 to the evaporator coil 24 is effectively regulated by the flow control mechanism 50 that opens and closes (modulates) as a function of the needs, that may be indicated by the suction pressure of the compressor 12. In the event that a thermal switch 82 in the top portion of the buffer 46 detects that the contents of the buffer are cold, it can either shut off the compressor 12 or actuate the selector valve 20 to couple the closed exchange loop 60 in circuit with the compressor. That is to say, instead of the refrigerant flowing through the thermal expansion valve 22 and the evaporator coil 24, it is made to flow through the thermal expansion switch 64 and the evaporator coil 66. Associated with the evaporator coil 66 is an auxiliary heat exchanger coil 70 connected in a closed loop that is filled with the suitable liquid circulated by the pump 80 through a heat exchanger 78 disposed at a heat source. Again, a flow control mechanism 76 that may be modulated by the suction pressure of the compressor 12 controls the rate of flow and, therefore, the rate of delivery of heat energy to the evaporator coil 66.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In an energy transfer system of the type including a refrigerant carrying loop having, in series, a heat transfer engine, a condenser, a first thermal expansion means and a main evaporator, the improvement comprising:

(a) first heat exchanger means having an inlet and an outlet operatively disposed in heat exchange relationship with the main evaporator for providing heat energy to the main evaporator;

(b) cold buffer means coupled in fluid communication with said first heat exchanger means for storing a heat transfer fluid, said buffer comprising a container having an upper and a lower end, with an inlet and an outlet at both the upper and lower end, the outlet at the upper end Coupled to an inlet of the first heat exchanger means and the inlet at the lower end coupled to an outlet of the first heat exchanger means; and (c) means connected to the outlet at the lower end and the inlet at the upper end for supplying the heat transfer fluid from the cold buffer means to a utilization device.

2. The energy transfer system as in claim 1 and further including:

(a) an auxiliary evaporator and a second thermal expansion means adapted to be connected in a series loop with the heat transfer engine and condenser through a selector valve.

3. The energy transfer system as in claim 2 and further including:

(a) an auxiliary heat exchanger means having an inlet and an outlet and being operatively disposed in heat exchange relationship with the auxiliary evaporator for providing heat energy to the auxiliary evaporator; and (b) means coupled between the inlet and outlet of the auxiliary heat exchanger means for extracting heat energy from a heat source and delivering such heat energy to the auxiliary evaporator.

4. The energy transfer system as in claim 3 and further including:

(a) temperature sensitive switching means disposed in the cold buffer means for controlling the selector valve whereby the auxiliary evaporator and second thermal expansion means are coupled in circuit with the heat transfer engine and condenser when a predetermined temperature condition of the heat transfer fluid in the cold buffer means exists.

5. The energy transfer system as in claim 3 wherein the means for extracting heat energy from the heat source comprises:

(a) a closed loop containing a heat transfer fluid and a heat exchange surface disposed in the heat source, the closed loop being connected in fluid communication with the auxiliary heat exchanger.

6. The energy transfer system as in claim 5 wherein the heat source is a body of water.

7. The energy transfer system as in claim 5 wherein the heat source is the earth.

8. The energy transfer system as in claim 3 and further including:

(a) a first flow control means connected in series with the first heat exchanger for controlling the flow of heat transfer fluid from the cold buffer means to the first heat exchanger means; and (b) a second flow control means connected in series with the auxiliary heat exchanger means for controlling the heat energy delivered to the auxiliary heat exchanger means.

9. The energy transfer system as in claim 8 wherein the first and second flow control means are responsive to a characteristic of the heat transfer engine.

10. The heat transfer fluid referred to in any of claims 1 through 9 in which the heat transfer fluid is a phase change substance.

11. The energy transfer system as in claim 1 and further including:

(a) flow control means connected in series with the first heat exchanger means for controlling the flow of heat transfer fluid from the cold buffer means to the first heat exchanger means.

12. The energy transfer system as in claim 11 wherein said flow control means is responsive to a characteristic of the heat transfer engine.

* * * * *